United States Patent [19]

Kulisek

[11] Patent Number: 4,542,878
[45] Date of Patent: Sep. 24, 1985

[54] BALL VALVE
[75] Inventor: Robert P. Kulisek, Erie, Pa.
[73] Assignee: Jarecki Industries, Fairview, Pa.
[21] Appl. No.: 521,951
[22] Filed: Aug. 10, 1983
[51] Int. Cl.⁴ ............................................. F16K 5/06
[52] U.S. Cl. ................................... 251/315; 251/317
[58] Field of Search ....................... 251/315, 314, 317

[56] References Cited

U.S. PATENT DOCUMENTS

| | | | |
|---|---|---|---|
| 2,998,957 | 9/1961 | Vulliez | 251/315 |
| 4,026,516 | 5/1977 | Matousek | 251/317 |

FOREIGN PATENT DOCUMENTS

| | | | |
|---|---|---|---|
| 184416 | 1/1956 | Austria | 251/314 |
| 6804743 | 10/1968 | Netherlands | 251/315 |

Primary Examiner—Martin P. Schwadron
Assistant Examiner—James R. Shay
Attorney, Agent, or Firm—Charles L. Lovercheck; Wayne L. Lovercheck; Dale R. Lovercheck

[57] ABSTRACT

A ball valve is disclosed herein having the portions of the ball surface removed which would be exposed to the fluid in the line when the valve is closed. These portions have bottoms of smaller diameter than the inside diameter of the seats for the ball. Therefore, the surface that has been exposed to liquid while the valve was closed cannot contact the valve seats during the turning cycle of the ball in the valve body either moving from closed to open or open to closed position.

1 Claim, 7 Drawing Figures

BALL VALVE

REFERENCE TO PRIOR ART

Applicant is aware of U.S. Pat. No. 842,183 on a cut-off valve which shows a tapered plug valve having the portion of the plug removed which would be exposed to the material in the flow line when the valve is closed. This valve does not have sealing rings nor does this valve have a circular flow passage or a domed surface of reduced diameter.

OBJECTS OF THE INVENTION

It is an object of the invention to provide an improved ball valve.

Another object of the invention is to provide a ball valve in which the outer periphery of the ball will be out of contact with the parts of the valve seals over the area which is engaged by the fluid path.

Another object of the invention is to provide a ball valve that is simple in construction, economical to manufacture, and simple and efficient to use.

Another object of the invention is to provide a ball valve having an increased operational life and seat life by preventing the working surfaces of the ball from interfering with the valve seats due to deposits of scale, corrosive pitting or build up of film from the service fluid. To achieve this, the spherical valve plug, having a passage-way therein, consists of having those portions of its surface which are exposed when the valve is shut, relieved or recessed so that these surfaces cannot contact the valve seats during the turning cycle of the valve either going from closed to open or open to closed positions. The accompanying drawings show for the purpose of exemplification, illustrations of the principles of this invention.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF DRAWINGS

Figure 3:
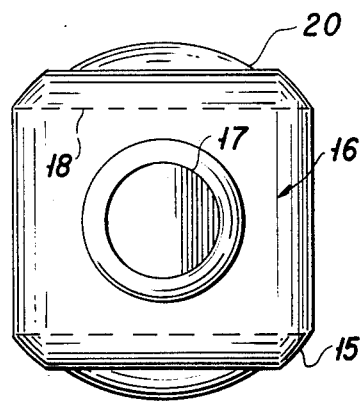
FIG. 3 shows the top view of the stem/ball.
Figure 2:
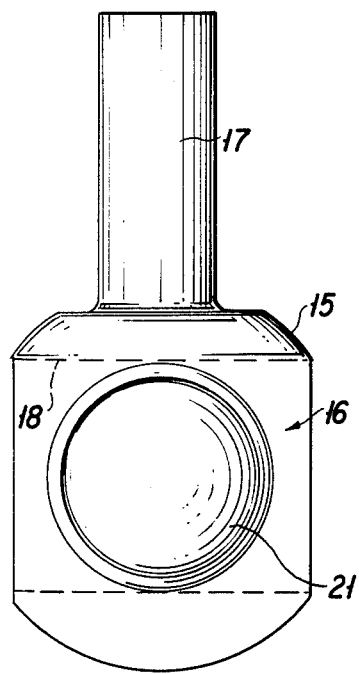
FIG. 2 shows a side view of the stem/ball.
Figure 1:
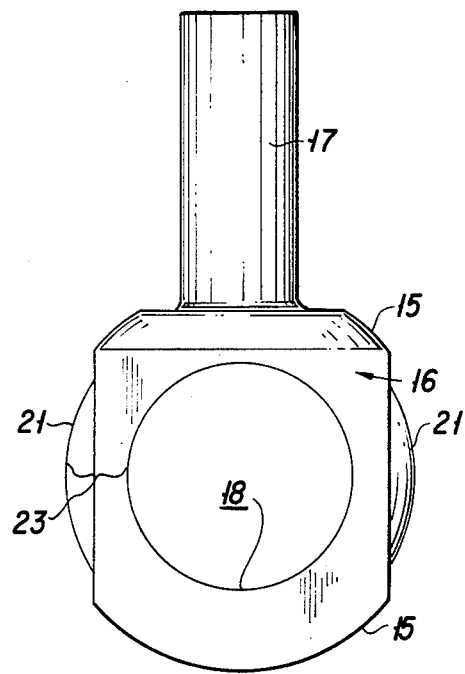
FIG. 1 shows a frontal view of a stem/ball used in the valve according to the invention.
Figure 4:
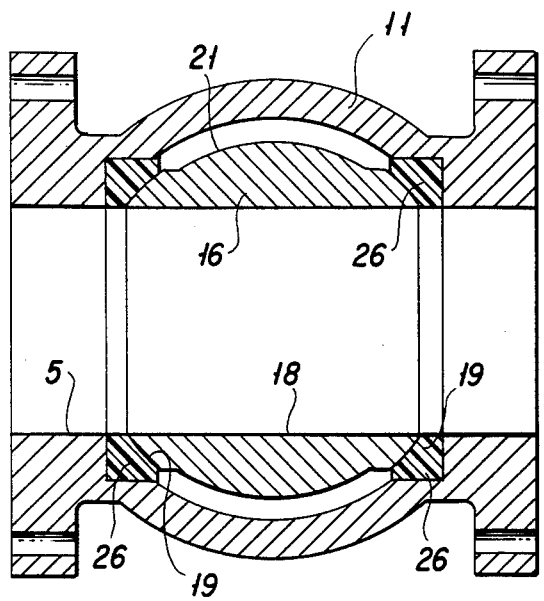
FIG. 4 is a central longitudinal sectional view of the ball valve showing the valve in its full open position.
Figure 5:
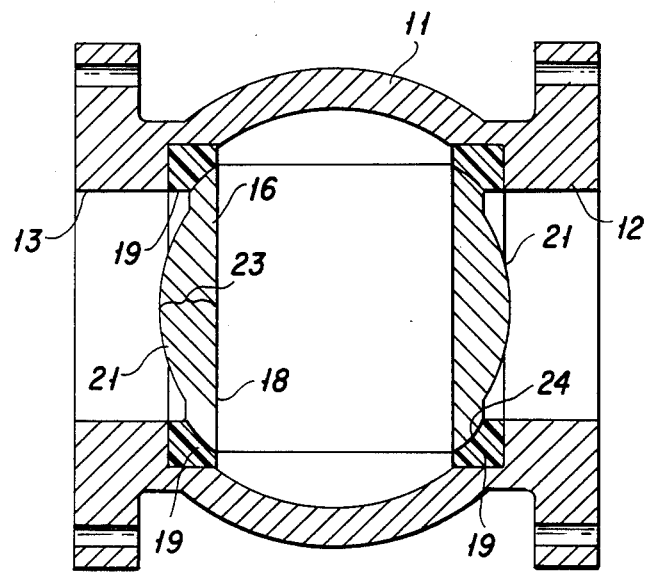
FIG. 5 is a view similar to FIG. 4 showing the valve in a full closed position.
Figure 6:
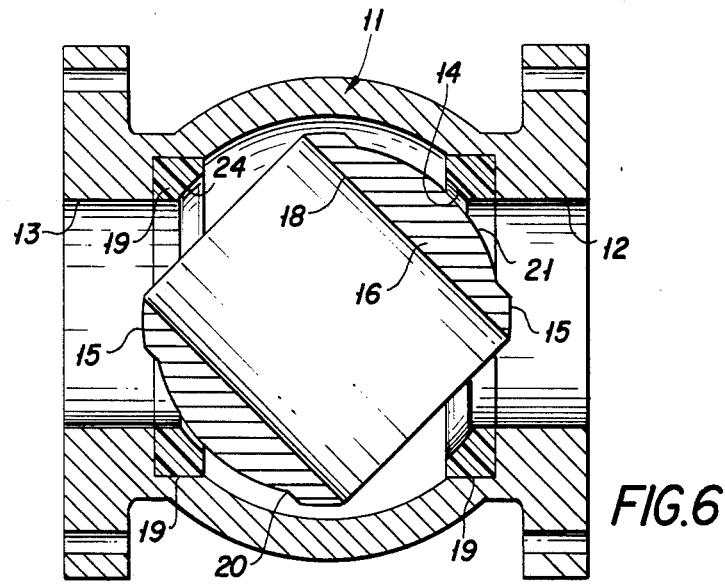
FIG. 6 is a longitudinal cross sectional view showing the relation of the spherical ball plug to the seal members in an intermediate, half open position.
Figure 7:
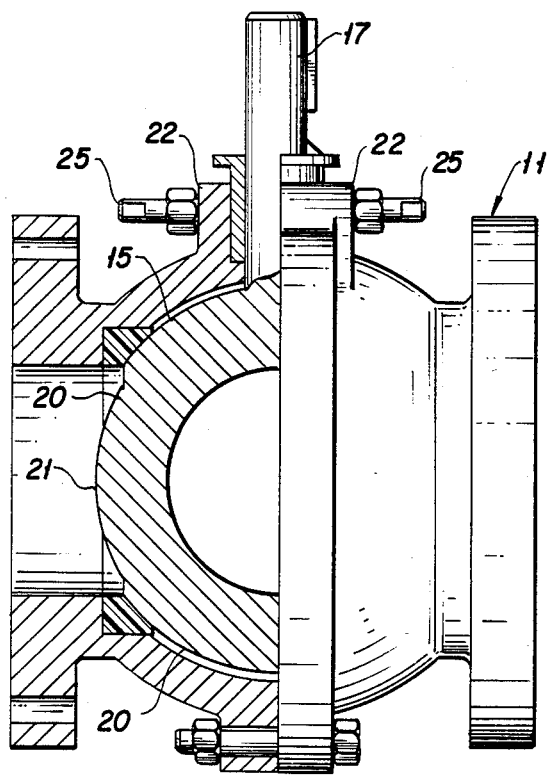
FIG. 7 is a partial cross sectional view similar to FIG. 4 showing the body construction.

Now, with more particular reference to the drawings, the spherical ball consists of a stem 17 which may be considered means for rotating the ball 16 from open to closed position. The ball is provided with a circular flow passage 18 for the purpose of connecting the flow passages 12 and 13 of the valve to a flow line. The valve body is indicated generally at 11. The sealing of the flow passage with the ball is achieved through intimate contact of the spherical ball seating surfaces 15 with the seats of rings 19. Rings 19 are set in grooves 26. Full contact is usually maintained by the seats 24 with the valve ball surface when the ball 16 is in fully opened or fully closed position. When the ball is fully closed or fully open sealing is accomplished where the ball seating surfaces 15 mate with the seats 24 on the sealing rings 19. The sides of the ball 16 which are blank are recessed at 20 and domed about a diameter less than the diameter of the ball 16 so as not to disturb the integrity of the spherical ball 16 when the valve is closed or to reduce the wall thickness 23 of the ball. The radius of the dome 21 is less than the radius of the basic spherical ball 16 so that the domed portion 21 does not make contact with the rings 19 when the valve is opened or closed providing a clearance 14 between the dome and the seals. The dome 21, rings 19 and valve body 11 cooperate to form an annular cavity surrounding the ball which is coaxial with the flow passages 12 and 13. The body is shown for illustration purposes and may be made in any manner familiar to those skilled in the art As illustrated in FIG. 5, the exposed recess face of the ball plug may accumulate foreign material over the domed surface 21, such as scale or corrosive pitting of the surface itself or film deposits which may occur during use. Such material will accumulate in the recessed surfaces 20 thus preventing seat damage or excessive turning torque which would otherwise be caused by interference of the working surfaces of the ball plug 16 and the rings 19.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A ball valve comprising a valve body and a ball member,
    said body having an inlet and an outlet with a flow passage between said inlet and said outlet and a ball receiving space in said flow passage between said inlet and said outlet in said flow passage,
    sealing means on said body surrounding said flow passage at each side of said ball receiving space,
    a ball member having a flow path therethrough,
    said ball member having a first spherical surface on the outside thereof generally conforming to the surface of said receiving space,
    said sealing means on said body comprising resilient rings each set in a groove in said body,
    each said resilient ring having a generally spherical surface adapted to engage said spherical surface of said ball around the said inlet to the flow path and around the outlet to said flow path and to terminate substantially at said flow path when said ball is rotated to align said flow path with said flow passage and when said ball is rotated to a position generally at right angles to said flow path,
    said ball having a relieved portion generally concentric to said first mentioned circle surface and having a smaller radius of curvature than said first mentioned circle surface on each side thereof spaced 90° from said inlet and outlet to said flow path, said resilient rings each having a sealing surface engaging the spherical outside surface of said ball over the total area of said spherical surface on said ball that is adapted to be exposed to liquid in a line in which said valve is connected when said valve is in the open and closed positions, said relieved portion, said resilient rings and said valve body cooperating to form an annular cavity surrounding said ball member and coaxial with said flow passage, said sealing means on said body being adapted to engage and cover said spherical surface on said ball member around said relieved spaces and around said inlet and said outlet when said ball is rotated 90° from alignment to said flow passage whereby liquid in said flow passage through said valve does not engage said spherical surface or said ball member or said sealing means or when said valve is rotated either to the open or closed position.

* * * * *